US007789041B1

(12) United States Patent
Taylor

(10) Patent No.: US 7,789,041 B1
(45) Date of Patent: Sep. 7, 2010

(54) INTERACTIVE PET FEEDING AND WATERING BOWL

(76) Inventor: Jacob Tipton Taylor, 5102 E. Gleneagles Dr., Tucson, AZ (US) 85718

( * ) Notice: Subject to any disclaimer, the term of this patent is extended or adjusted under 35 U.S.C. 154(b) by 41 days.

(21) Appl. No.: 11/891,946

(22) Filed: Aug. 13, 2007

Related U.S. Application Data

(60) Provisional application No. 60/838,076, filed on Aug. 15, 2006.

(51) Int. Cl.
*A01K 1/10* (2006.01)
(52) U.S. Cl. ............... 119/61.5; 119/51.01; 119/51.02
(58) Field of Classification Search ........... 119/51.01, 119/51.02, 51.11, 51.5, 61.5, 61.56, 61.57, 119/72, 707, 712, 719; 434/127; 446/175, 446/484
See application file for complete search history.

(56) References Cited

U.S. PATENT DOCUMENTS

| | | | | |
|---|---|---|---|---|
| 1,191,184 | A * | 7/1916 | Hooper | 119/61.1 |
| 3,498,268 | A * | 3/1970 | Langevin et al. | 119/61.54 |
| 4,798,170 | A * | 1/1989 | DePiazzy | 119/61.57 |
| 5,239,943 | A * | 8/1993 | Kim | 119/51.12 |
| 5,299,529 | A * | 4/1994 | Ramirez | 119/51.11 |
| 5,387,108 | A * | 2/1995 | Crowell | 434/319 |
| D370,749 | S * | 6/1996 | Lillelund et al. | D30/129 |
| 5,577,918 | A * | 11/1996 | Crowell | 434/319 |
| 6,199,510 | B1 * | 3/2001 | Louden | 119/51.01 |
| 6,318,291 | B1 * | 11/2001 | Wolanski | 119/61.5 |
| D453,243 | S * | 1/2002 | Burke | D30/161 |
| 6,651,592 | B2 * | 11/2003 | Maddox et al. | 119/720 |
| 6,722,318 | B2 * | 4/2004 | Hotmer | 119/712 |
| D504,196 | S * | 4/2005 | Huthmaker et al. | D30/129 |
| 6,904,868 | B2 * | 6/2005 | Block et al. | 119/51.12 |
| 6,912,970 | B2 * | 7/2005 | Sage, Jr. | 119/61.5 |
| 7,159,539 | B2 * | 1/2007 | Neckel | 119/51.02 |
| 7,263,953 | B2 * | 9/2007 | Sundararajan | 119/719 |
| 7,264,377 | B2 * | 9/2007 | Cooper et al. | 362/276 |
| 2005/0066905 | A1 * | 3/2005 | Morosin et al. | 119/51.02 |
| 2005/0224003 | A1 * | 10/2005 | Yin et al. | 119/61.5 |

OTHER PUBLICATIONS

Quasarelectronics.com Web Page—dated Aug. 7, 2007.
Gismodo.com Web Page—dated Aug. 8, 2007.
Gizmag.com Web Page—dated Aug. 8, 2007.

* cited by examiner

*Primary Examiner*—Kimberly S Smith
*Assistant Examiner*—Danielle Clerkley
(74) *Attorney, Agent, or Firm*—Gregory J. Nelson

(57) ABSTRACT

An interactive pet feeding and watering bowl which defines a food or watering containing dish. A voice module is recordable to record audible messages for the pet. The module is removably contained in a compartment in the bowl. A sensor, such as a proximity sensor, detects entry into the bowl when an animal is feeding or drinking which activates a voice module. Preferably the bowl is shaped to direct the animal to approach the bowl from the front.

4 Claims, 6 Drawing Sheets

INTERACTIVE PET FEEDING AND WATERING BOWL

CROSS REFERENCE IS MADE

This application is based on U.S. Provisional Patent Application Ser. No. 60/838,076, filed Aug. 15, 2006, of the same title.

FIELD OF THE INVENTION

The present invention relates to an interactive pet feeding and watering bowl which will contain food or water to provide nourishment on demand and which includes a voice record playback (VRP) device which will deliver a recorded message when the pet approaches the bowl to eat or drink.

BACKGROUND OF THE INVENTION

Pet owners continually seek ways of making their pets more comfortable and seek ways to better relate to their pets. Animals such as dogs are often highly domesticated and in many cases are left in a home or kennel for extended periods of time. These periods of absence from the animal's human "family" can cause anxiety and can cause an animal to become discontented and even destructive. Animals sometimes will also refuse to eat when left for long periods of time. Accordingly, there exists the need for a pet feeding and watering device which will, by recording the master's voice or other sound, both calm the animal allaying anxiety and encouraging the animal to eat and drink.

BRIEF SUMMARY OF THE INVENTION

The present invention relates to a pet bowl which may be made of plastic, metal or ceramic and which has a dish which contains food or water for household and domestic pets such as dogs, cats and even birds.

The bowl has a compartment within which is an electronic voice module which may be used to record audible messages for the pet such as the recording of a human or the master's voice or other audio such as recorded music. A proximity sensor is located on the module and directs an optical beam through a lens on the interior of the bowl. The beam is projected across the dish bowl so that when a pet eats or drinks from the bowl, the beam is interrupted or reflected and the optical sensor is activated causing the voice module to play the recorded message. The voice module contains a power source such as batteries, an electronic circuit board, microphone and speaker. A recording is made by depressing a record button on the voice module, the duration of which can vary from 10-15 seconds or more. The voice module is inserted into a compartment in the bowl and may be held in place by a detent, spring or loop and hook fasteners 50 and the module may be easily removed from the bowl for cleaning, maintenance or recording.

The bowl may be provided in different sizes, depending upon the particular application. A small size may be provided for use with small animals and birds and may be attachable to a kennel or a bird cage. Larger size bowls may be provided for medium and large size pets. The bowl may be of various shapes, but is preferably semi-circular or other shape which diverges from the front of the bowl to the rear of the bowl to direct the animal to approach from the front of the bowl so that, as the animal's nose or beak enters the bowl, the sensor will detect the presence of the animal and activate the voice module and play the recorded message.

BRIEF DESCRIPTION OF THE DRAWINGS

The above and other advantages and objects of the present invention will become more apparent from the following description, claims and drawings in which:

DETAILED DESCRIPTION OF THE DRAWINGS

Figure 1:
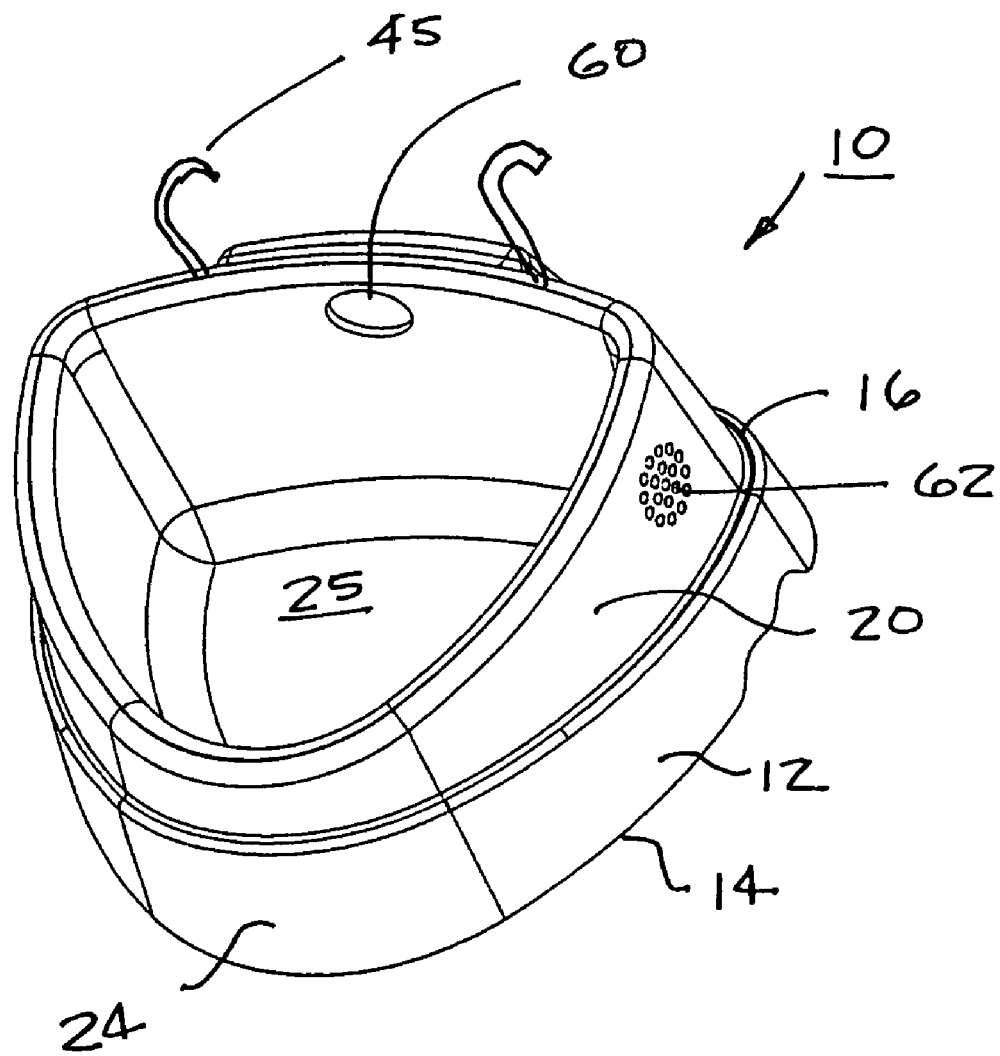
FIG. 1 is a perspective view of the bowl of the present invention.
Figure 2:
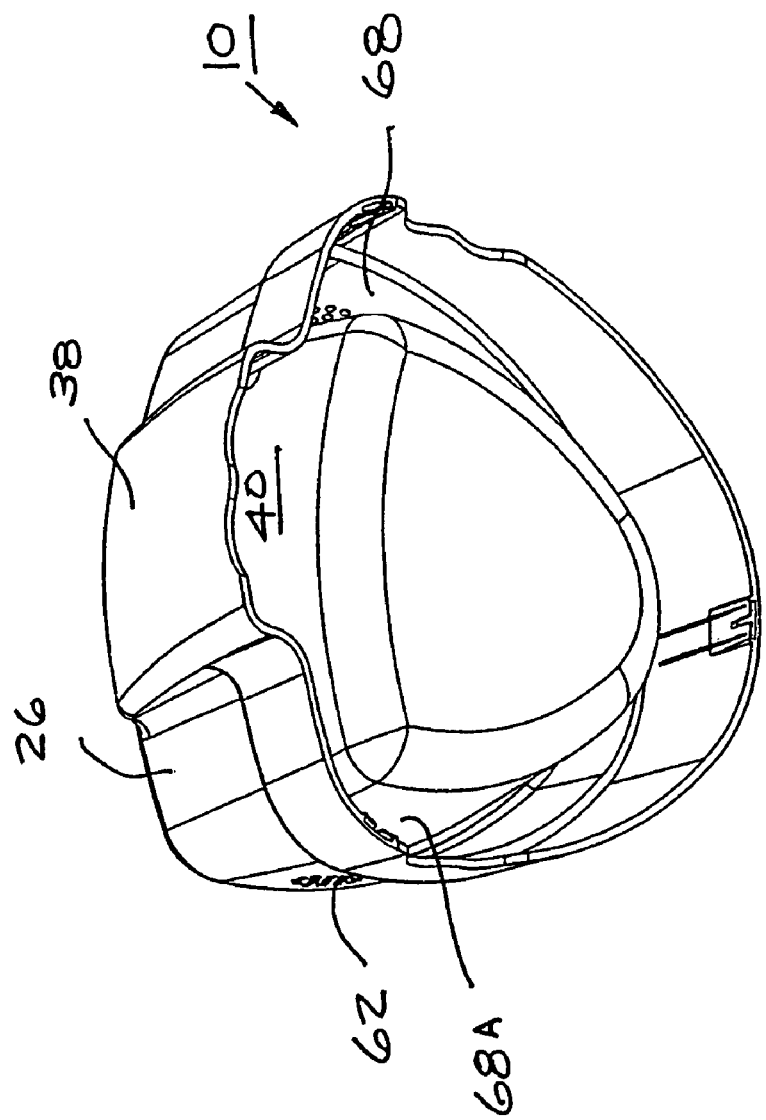
FIG. 2 is a bottom view of the bowl of the present invention.
Figure 3:
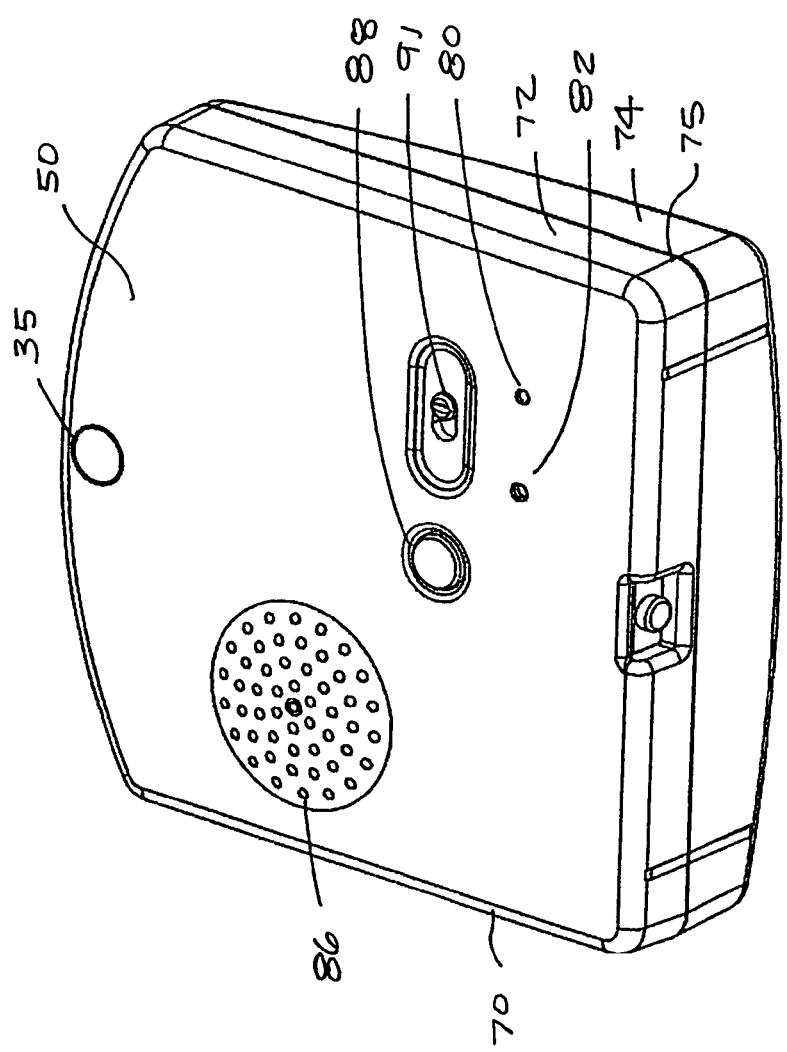
FIG. 3 shows the voice module.

Turning now to the drawings, the pet bowl of the present invention is best seen in FIGS. 1 to 4 is designated by the numeral 10. The bowl has a lower, outer wall section 12 which defines a base 14 which supports the bowl. The lower wall transitions at an edge 16 into an upper wall section 20 which extends around the food and water dish 25 in the bowl. Both the lower wall and upper wall sections are similarly shaped having a front, semi-circular or generally parabolic wall section 24 and a rear wall section 26. Preferably the bowl is integrally formed from ABS or a similar material as by injection molding or other fabrication technique. Hangers 45 may be provided to suspend the bowl from a cage or kennel wall.

Viewing the bowl from the top, as seen in FIG. 1, the sides of the feeding dish 25 diverge rearwardly from the front 24 of the bowl to the rear 26. In this manner, the pet is directed to feed from the front of the bowl by inserting its nose or beak into the front portion which will trigger the sensor 35, as will be explained.

The rear wall has an enlargement 38 which defines a compartment 40 which receives the voice module 50. The compartment wall 41 is forwardly inclined to better direct the sensor beam across the dish as will be explained. The compartment 40 is open at the underside and may include a retainer such as a spring, straps 51 having cooperating loop-and-hook fastener sections 52 which will serve to positively engage the voice module 50 to retain it in place. This allows the voice module to be removed for replacement of the battery or recording of a message, as well as facilitate cleaning the bowl in a manner not to damage the voice module.

The upper sidewall 20 of the bowl increases in height from the front to the back wall section which will further assist in properly directing the pet to the proper feeding position.

A clear lens or window 60 is provided in the center of the rear wall near the upper edge of the dish 25. This window will align with the sensor 35 in the voice module. Speaker openings 62 are defined at opposite sides of the bowls by a plurality of holes extending through the upper sidewall. It will be seen that from FIG. 2, which shows the underside of the bowl, that a channel or passageways 68, 68A extend between the outer surface of the dish and the walls 12, 20 so that sound emanating from the voice module 50 will be transmitted along the channels 68, 68A to the oppositely located speaker openings 62.

Figure 4:
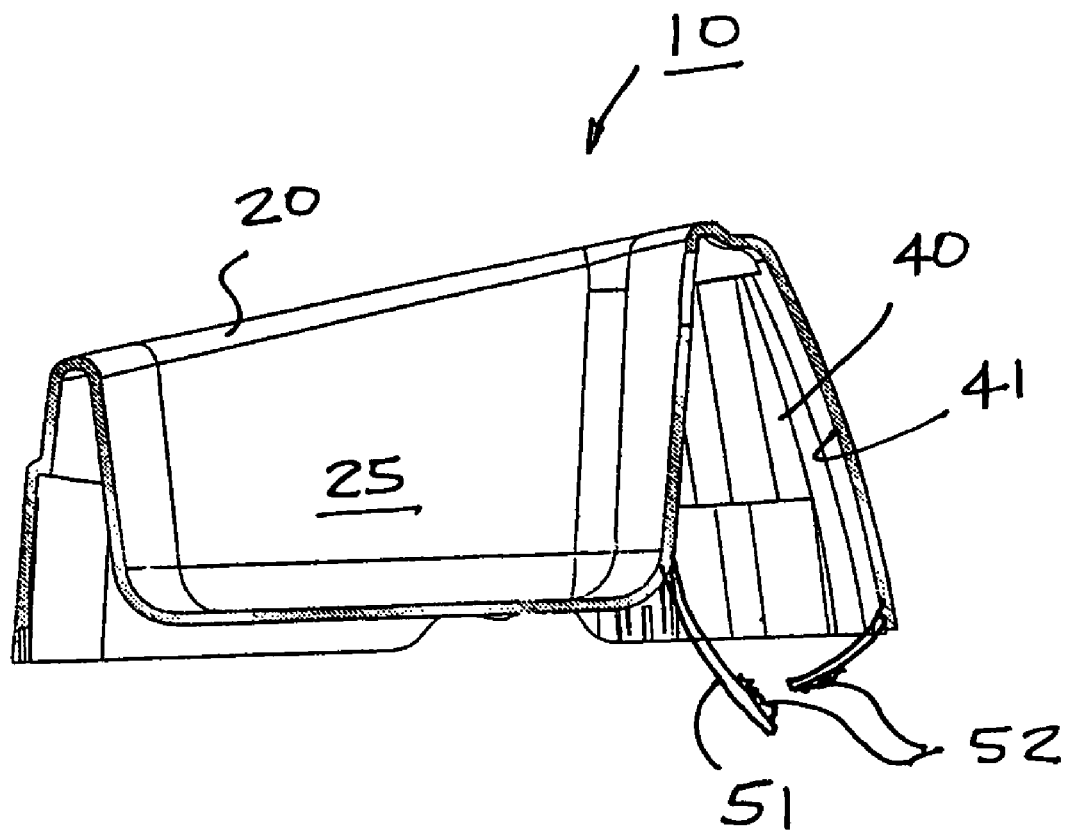
FIG. 4 is a cross-sectional view of the bowl.
Figure 5:
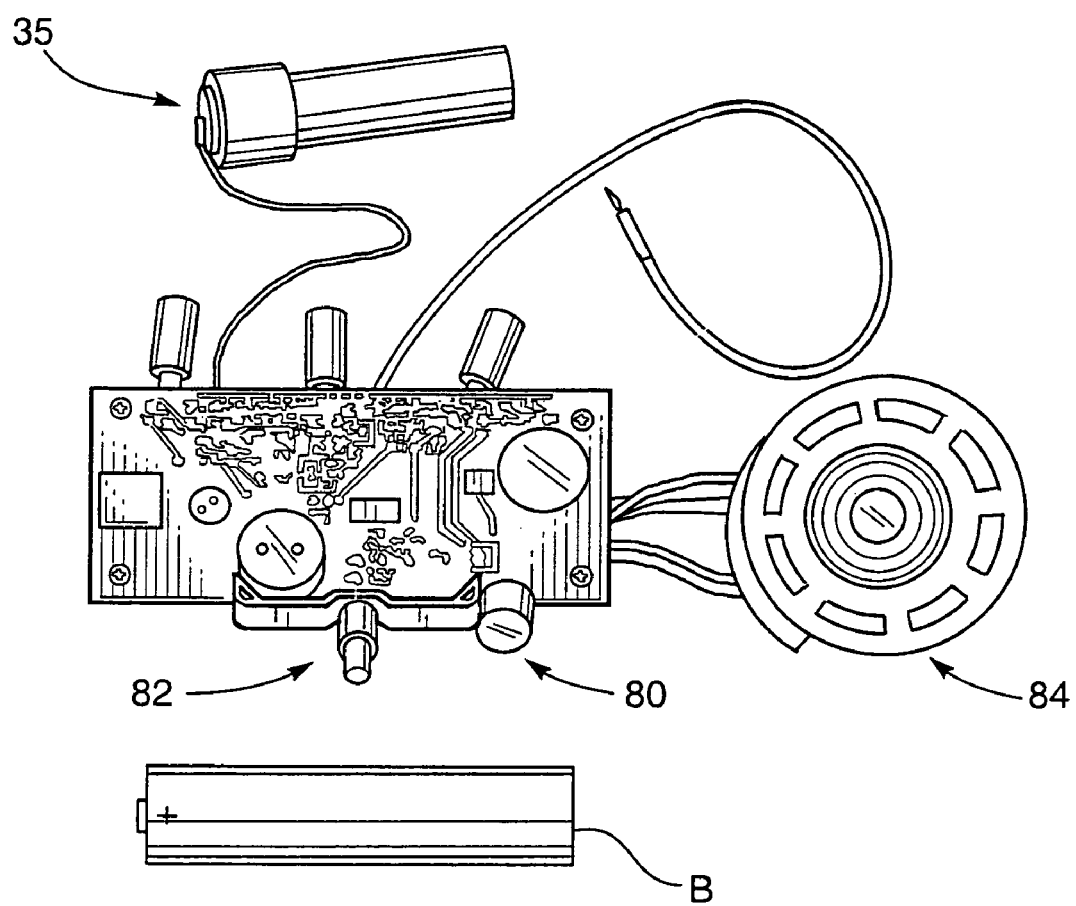
FIG. 5 shows the components of the voice module.

The voice module 50 has an outer housing 70 which is generally rectangular having front and rear sections 72, 74 which are secured along their periphery and may be disengaged for access to the components and the battery compartment. The electronic circuit 75 has a microphone 80 and LED 82 indicating the status of the unit, a speaker 84, a sensor 35 and circuit board 85. The circuit diagram is shown in FIG. 5 and the components are shown in FIG. 4.

The voice module 50 is a sound-generating microchip device well known to those skilled in the art and available from various sources such as Quasar Electronics®. Such devices may be configured to record messages of varying length, typically from 10-40 seconds and are re-recordable.

Figure 6:
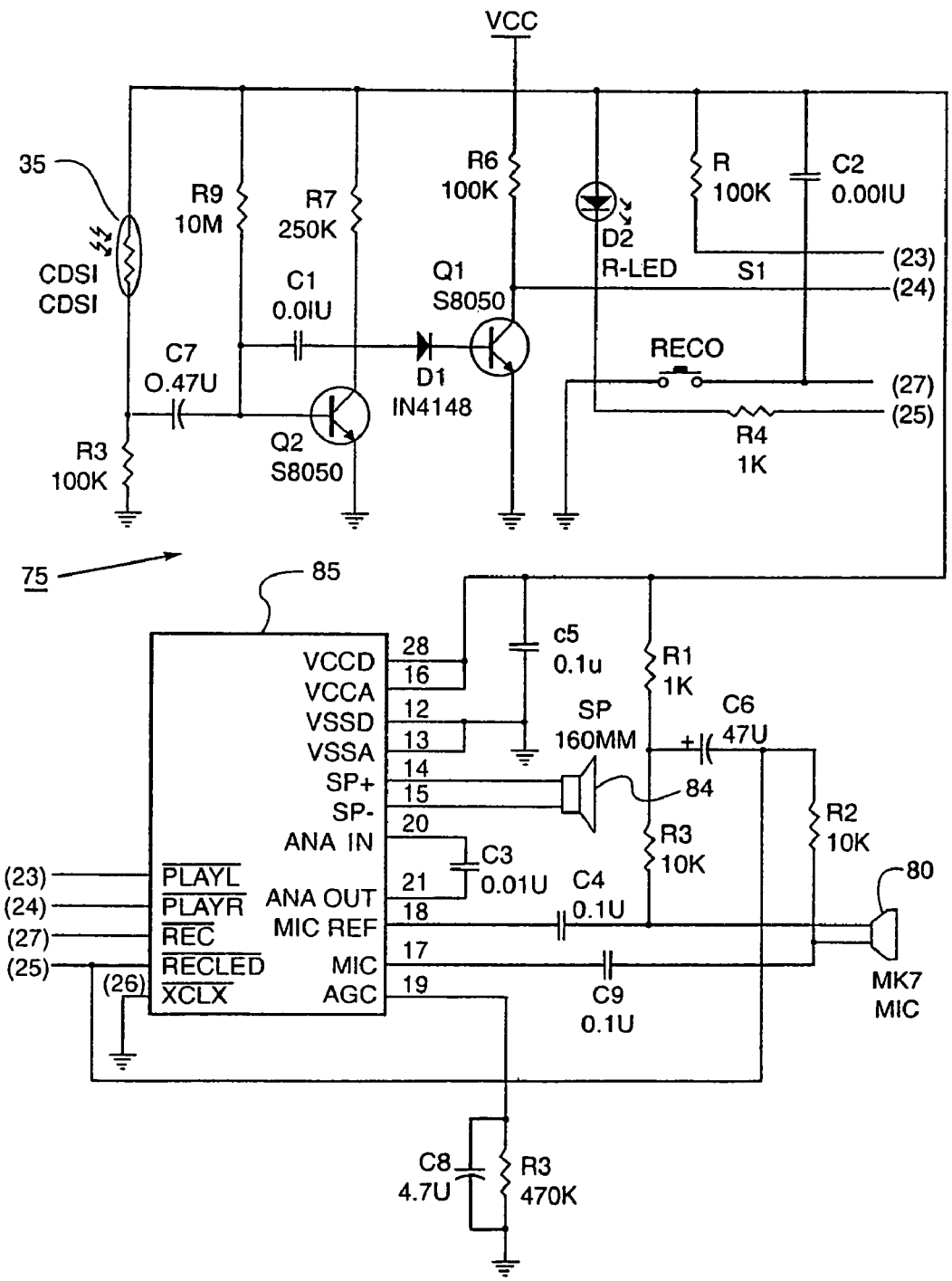
FIG. 6 is a schematic diagram of the voice module.

The front housing section 72 has a button 88 which, when depressed, will initiate recording. The LED 82 indicates recording is occurring. Microphone 84 is located in the housing adjacent apertures 86. Digital devices of this type can be used to store messages and, once recorded, the lock 90 will place the module in the playback mode. The unit may be powered by a suitable batteries 95. The schematic diagram FIG. 6 is representative and devices of this type are known to those skilled in the art.

The sensor 35 emits a beam through lens 60 across the dish at an elevation above the normal food or water level. The compartment wall 41 is forwardly angled so the module 50 is slightly forwardly tilted and directs the beam downwardly toward the front of the dish 25. When the beam is interrupted, the module 50 is activated to play the recording. A representative device of this type is available from Lynx Motion. The sensor 35 is preferably an optical device such as a photoelectric cell, IR proximity sensor, inductive sensor, or other type of proximity sensor. The sensor may also comprise a switch activated by engagement with the animal as it begins to eat or drink.

In use, a pet owner will initially remove the voice module from the bowl by first releasing the strap 51 and then grasping the lower edge of the module end, pulling it from the compartment to release it. The retainer straps 52 will retain the module in place during normal operation. When the housing 70 is removed, the owner may service the unit by replacing the batteries B. The module housing will also normally be removed during cleaning to prevent water from damaging the module. When the module is removed, the user can place the unit in the record mode at the slide switch 91. The user may then speak into the microphone 80 and record a suitable message from 10 to approximately 40 seconds in length. The message may be a message to a pet such as a dog such as "good boy, Fido," "good kitty" etc. Such a message will have a calming effect on the animal. When the recording is completed, the slide switch 91 is put in the lock position and the voice module 50 reinserted into the compartment at the rear of the bowl. In this position, the sensor 35 will emit an optical beam which will be transmitted through the lens 60 in the upper rear section of the bowl. The lens is positioned so that the activating beam projects to the front of the dish at an elevation above the normal food or water level. Thus, when water or food is in the bowl, the animal or pet will normally feed from the narrow front of the bowl. The insertion of the animal's nose or beak into the dish in order to obtain food or water will interrupt the optical beam which will trigger the voice module to play the recorded message.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A pet feeding and watering device comprising:
(a) a double walled bowl defining a dish having a generally parabolic sidewall and a rear wall, said bowl having an edge extending around the feeding dish between an inner and outer wall of said double walled bowl and defining a compartment adjacent the rear wall, an audio transmission channel extending from said compartment between the inner and outer parabolic sidewalls, said outer parabolic wall having sound apertures at opposing sides of said parabolic outer sidewall;
an aperture located in the inner rear wall for insertion of a motion sensor;
said edge of said bowl decreases in height from said rear wall to said parabolic sidewall such that a sensor inserted into the aperture is directed downwardly across said dish to an opposing location of said parabolic inner wall; and
(b) a voice recording module, said module having a speaker, a motion sensor, a microphone, circuitry and a power supply, said module removably mounted in said compartment with said motion sensor positioned to detect the presence of a portion of a pet within the dish to initiate a calming recording which is transmitted via said channel to said sound apertures in the area adjacent the pet's ears when the pet is feeding or drinking from the bowl.

2. The pet feeding and watering device of claim 1 wherein retaining means are associated with said compartment to releasably retain said module in said compartment.

3. The pet feeding and watering device of claim 1 wherein the bowl is injection molded.

4. The pet feeding and watering device of claim 1 wherein the bowl has attachment means for securement to a pet enclosure.

* * * * *